US008838163B2

(12) United States Patent
Yang et al.

(10) Patent No.: US 8,838,163 B2
(45) Date of Patent: Sep. 16, 2014

(54) METHOD AND APPARATUS FOR CONTROLLING POWER IN WIRELESS COMMUNICATION SYSTEM

(75) Inventors: Sang-Hyun Yang, Anyang-si (KR); Seung-Hee Han, Hwaseong-si (KR); Seung-Joo Maeng, Seongnam-si (KR); Il-Won Kwon, Ansan-si (KR); Jeong-Heon Kim, Ansan-si (KR); Seung-Hyun Min, Seoul (KR); Ji-Won Lee, Seongnam-si (KR); Seung-Hyeon Nahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 13/475,214

(22) Filed: May 18, 2012

(65) Prior Publication Data
US 2012/0295656 A1  Nov. 22, 2012

(30) Foreign Application Priority Data

May 20, 2011  (KR) ........................ 10-2011-0048004

(51) Int. Cl.
*H04W 52/04* (2009.01)
*H04W 52/26* (2009.01)
*H04W 52/24* (2009.01)

(52) U.S. Cl.
CPC ............ *H04W 52/24* (2013.01); *H04W 52/262* (2013.01)
USPC ............ 455/522; 455/69; 455/13.4; 455/135; 370/329

(58) Field of Classification Search
CPC . H04W 52/24; H04W 52/262; H04W 52/241; H04W 52/242; H04W 52/243; H04W 52/245; H04W 52/246; H04W 52/247; H04W 52/248; H04W 52/265; H04W 52/267; H04W 52/00; H04W 52/30; H04W 52/38
USPC ............. 455/522, 69, 91, 352, 500, 501, 509, 455/527, 70, 13.4, 450, 103, 561, 127.1; 370/328, 310, 311, 334, 210, 344, 252, 370/260, 329
See application file for complete search history.

(56) References Cited

U.S. PATENT DOCUMENTS

| | | | |
|---|---|---|---|
| 7,616,596 B2* | 11/2009 | Lee et al. ........................ 370/326 |
| 7,797,013 B2* | 9/2010 | Skarby et al. ................. 455/522 |
| 7,843,889 B2* | 11/2010 | Kim et al. ..................... 370/334 |
| 2004/0087331 A1* | 5/2004 | Hwang et al. ................. 455/522 |
| 2007/0142087 A1* | 6/2007 | Kim et al. ..................... 455/561 |
| 2007/0183312 A1* | 8/2007 | Kim .............................. 370/210 |
| 2007/0202882 A1* | 8/2007 | Ju et al. ......................... 455/450 |
| 2008/0207143 A1* | 8/2008 | Skarby et al. ................. 455/103 |
| 2009/0238292 A1* | 9/2009 | Clerckx et al. ................ 375/260 |
| 2010/0234061 A1* | 9/2010 | Khandekar et al. ........... 455/522 |
| 2011/0070845 A1* | 3/2011 | Chen et al. ...................... 455/91 |
| 2011/0176472 A1* | 7/2011 | Amini et al. ................... 370/312 |
| 2011/0267967 A1* | 11/2011 | Ratasuk et al. ............... 370/252 |
| 2011/0286391 A1* | 11/2011 | Chen et al. .................... 370/328 |
| 2011/0319120 A1* | 12/2011 | Chen et al. .................... 455/522 |
| 2012/0008707 A1* | 1/2012 | Kim et al. ..................... 375/295 |

(Continued)

*Primary Examiner* — Tan Trinh
(74) *Attorney, Agent, or Firm* — Jefferson IP Law, LLP

(57) ABSTRACT

A base station in a wireless communication system and a method for controlling power by the same are provided. The method includes receiving channel state information from a mobile terminal, calculating information regarding a Modulation order Product code Rate (MPR) of the mobile terminal using the channel state information, and controlling transmission power for the mobile terminal according to the information regarding the MPR.

18 Claims, 2 Drawing Sheets

(56) References Cited

U.S. PATENT DOCUMENTS

| | | | |
|---|---|---|---|
| 2012/0327884 A1* | 12/2012 | Seo et al. | 370/329 |
| 2013/0121279 A1* | 5/2013 | Noh et al. | 370/329 |
| 2013/0163528 A1* | 6/2013 | Kim et al. | 370/329 |
| 2013/0203453 A1* | 8/2013 | Kang | 455/501 |
| 2014/0011494 A1* | 1/2014 | Haim et al. | 455/422.1 |

* cited by examiner

METHOD AND APPARATUS FOR CONTROLLING POWER IN WIRELESS COMMUNICATION SYSTEM

PRIORITY

This application claims the benefit under 35 U.S.C. §119(a) of a Korean patent application filed in the Korean Intellectual Property Office on May 20, 2011 and assigned Serial No. 10-2011-0048004, the entire disclosure of which is hereby incorporated by reference.

BACKGROUND OF THE INVENTION

1. Field of the Invention

The present invention relates to a method and an apparatus for controlling power in a wireless communication system. More particularly, the present invention relates to a method and an apparatus for controlling power according to a terminal's communication environment in a wireless communication system.

2. Description of the Related Art

Wireless communication system specifications provide references regarding an Error Vector Magnitude (EVM) of transmission signals according to a modulation order. As used herein, the EVM is an index of a required quality for transmission signals, and indicates a difference between a reference waveform and a measured waveform in connection with an output signal from a radio frequency amplifier.

In a wireless communication system, generally, a decrease in the EVM corresponds to an increase in quality of the transmission signal, but the decrease in the EVM increases a cost of manufacturing and a complexity of implementing an amplifier in a base station of a wireless communication system. Therefore, the implementation is generally made at such a level that satisfies the EVM required by specifications. For example, $3^{rd}$ Generation Partnership Project (3GPP) Long Term Evolution (LTE) specifications require that the EVM be equal to or less than 17.5% for Quadrature Phase Shift Keying (QPSK), 12.5% for 16 Quadrature Amplitude Modulation (QAM), and 8% for 64 QAM.

The EVM needs to satisfy required conditions when the base station is operated at a maximum output. When the amplifier is operated at low output, the amplifier's linearity improves, and the EVM decreases. However, the low output reduces the base station's coverage and degrades the downlink signal quality.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for controlling power in a wireless communication system such that conditions required for an Error Vector Magnitude (EVM) are satisfied, and so as to prevent a reduction of a base station coverage area.

Another aspect of the present invention is to provide a method and an apparatus for controlling power in a wireless communication system such that the EVM is reduced while preventing degradation of the downlink channel quality.

Another aspect of the present invention is to provide a method and an apparatus for controlling transmission power according to the EVM and the downlink channel quality in a wireless communication system.

In accordance with an aspect of the present invention, a method for controlling power by a base station in a wireless communication system is provided. The method includes receiving channel state information from a mobile terminal, calculating information regarding a Modulation order Product code Rate (MPR) of the mobile terminal using the channel state information, and controlling transmission power for the mobile terminal according to the information regarding the MPR.

In accordance with another aspect of the present invention, a method for controlling power by a base station in a wireless communication system is provided. The method includes receiving information regarding a channel state of a downlink from a mobile terminal, determining a downlink channel state of the mobile terminal, and reducing transmission power of the downlink channel when the downlink channel state of the terminal is equal to or higher than a predetermined threshold value.

In accordance with another aspect of the present invention, a base station in a wireless communication system is provided. The base station includes a receiver for receiving channel state information from a mobile terminal, a transmitter for transmitting a signal to the mobile terminal, and a controller for calculating information regarding a MPR of the mobile terminal using the channel state information and for controlling transmission power for the mobile terminal according to the calculated information regarding the MPR.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
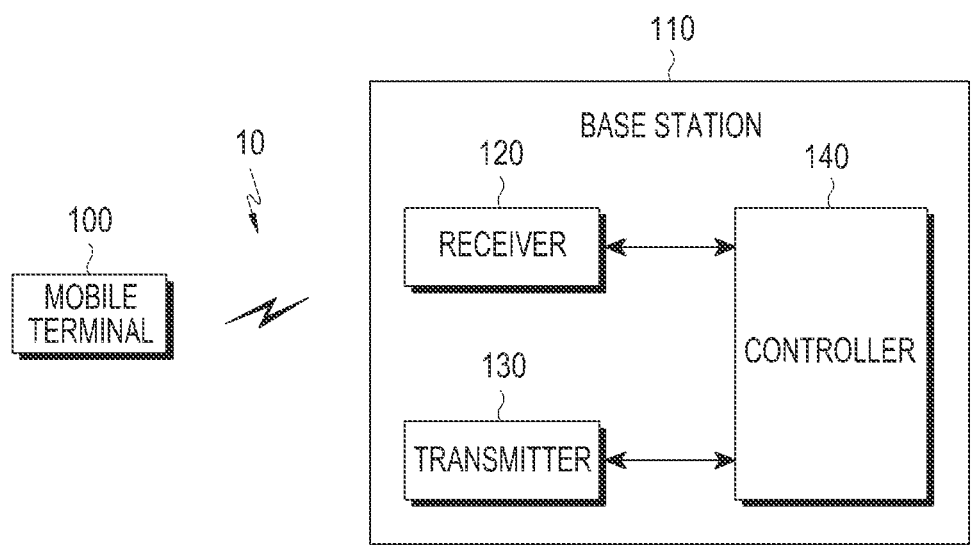
FIG. 1 illustrates a wireless communication system according to an exemplary embodiment of the present invention.

FIG. 1 illustrates a wireless communication system according to an exemplary embodiment of the present invention.

Referring to FIG. 1, a wireless communication system 10 includes a mobile terminal 100 and a base station 110. The base station 110 includes a receiver 120, a transmitter 130, and a controller 140.

When the base station 110 and the mobile terminal 100 communicate with each other, the base station 110 transmits a reference signal to the mobile terminal 100 through the transmitter 130. The mobile terminal 100 determines a state of a downlink channel between the base station 110 and the mobile terminal 100 by using the reference signal, and transmits information regarding the downlink channel state to the base station 110. The base station 110 receives the information regarding the downlink channel state from the mobile terminal 100 through the receiver 120, and controls transmission power of the base station 110 with respect to the mobile terminal 100 using the information regarding the downlink channel state.

The information regarding the channel state transmitted from the mobile terminal 100 to the base station 110 includes a Channel Quality Indicator (CQI), a Rank Indicator (RI), a Precoding Matrix Indicator (PMI), and other similar types of information related to wireless communications channel states. The CQI is an indicator of the downlink channel quality indicating 16 levels of quality, ranging from '0' for the poorest state to '15' for the best state. In an exemplary embodiment of the present invention, it can be said that, when the mobile terminal 100 provides a CQI equal to or higher than a predetermined threshold value, it is positioned in an area having a high field strength. In addition, the downlink channel quality is considered to be good or high quality when the mobile terminal 100 is positioned in an area having the high field strength.

The base station 110 transmits the reference signal at the same power level for an entire signal bandwidth. In the case of a $3^{rd}$ Generation Partnership Project (3GPP) Long Term Evolution (LTE) system, for example, for a downlink channel in a symbol range of the entire signal bandwidth, wherein, a reference signal is inserted into the downlink channel, the power level of the downlink channel is determined as a relative value between a power level of the reference signal and a power lever of a data signal. Alternatively, in a case where a downlink channel is in a symbol range, wherein, no reference signal is inserted into the downlink channel, the power level of the downlink channel is determined using parameter ρA, for example.

The parameter ρA is a ratio of a power of a data signal to a power of a reference signal, and the base station 110 provides the parameter ρA to the mobile terminal 100 through signaling. The parameter ρA corresponds to a parameter PA, which is used by the base station 110 to control the power of the downlink channel according to the present exemplary embodiment. The controller 140 of the base station 110 may adjust a transmission power using a value of the parameter PA. For example, when the value of the parameter PA rises, the transmission power level is increased, and, conversely, when the value of the parameter PA drops, the transmission power level is decreased.

The controller 140 may adjust the transmission power level according to whether the mobile terminal 100 is positioned in an area of high field strength in order to provide a high quality downlink channel. For example, when the mobile terminal 100 is positioned in an area of high field strength, the transmission power level is decreased in order to reduce an Error Vector Magnitude (EVM). On the other hand, when the mobile terminal 100 moves out of the area of high field strength, the transmission power level is increased.

Meanwhile, in order to estimate the downlink channel state, the controller 140 obtains an est_cinr_dB, which has units of decibels (dB) and which is a downlink estimation value, using the CQI. The controller 140 then adjusts the PA value using the est_cinr_dB, as will be described in detail below. The term "cinr" of the est_cinr_dB refers to a Carrier to Interference Noise Ratio (CINR).

Figure 2:
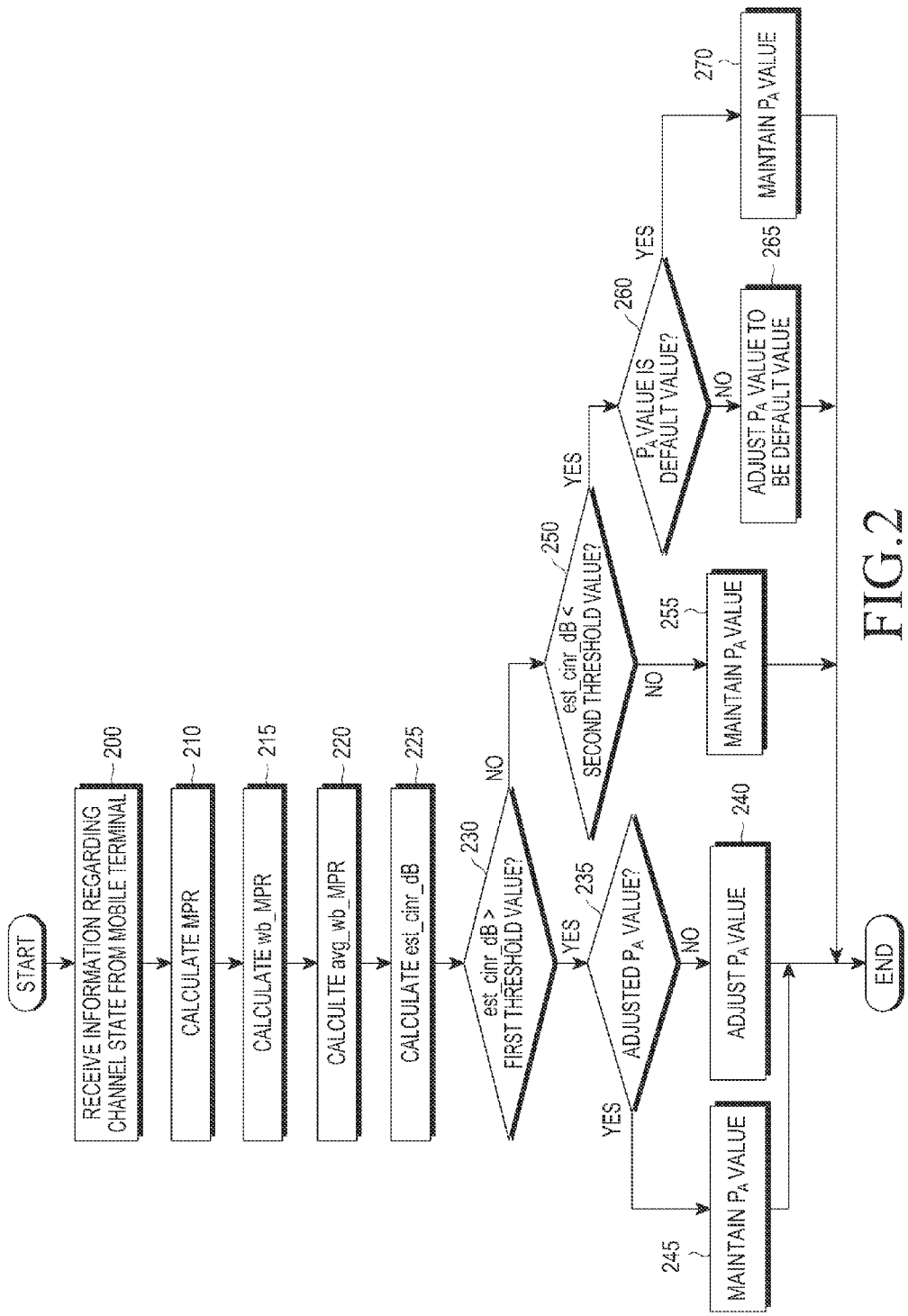
FIG. 2 is a flowchart of a method for controlling power by a base station according to an exemplary embodiment of the present invention.

FIG. 2 is a flowchart of a method for controlling power by a base station according to an exemplary embodiment of the present invention.

The controller 140 receives information regarding the channel state from the mobile terminal 100 in step 200. Next, in step 210, the controller 140 calculates a Modulation order Product code Rate (MPR) value of the mobile terminal 100 using the CQI included in the information regarding the channel state. A relationship between the CQI value and the MPR value is given in Table 1 below.

TABLE 1

| CQI index | modulation | MPR |
|---|---|---|
| 0 | out of range | |
| 1 | QPSK | 0.1523 |
| 2 | QPSK | 0.2344 |
| 3 | QPSK | 0.3770 |
| 4 | QPSK | 0.6016 |
| 5 | QPSK | 0.8770 |
| 6 | QPSK | 1.1758 |
| 7 | 16QAM | 1.4766 |
| 8 | 16QAM | 1.9141 |
| 9 | 16QAM | 2.4063 |
| 10 | 64QAM | 2.7305 |
| 11 | 64QAM | 3.3223 |
| 12 | 64QAM | 3.9023 |
| 13 | 64QAM | 4.5234 |
| 14 | 64QAM | 5.1152 |
| 15 | 64QAM | 5.5547 |

After the MPR value is calculated in step 210, then, in step 215, the controller 140 multiplies the MPR value by k in order to calculate a wb_MPR value. When there are a plurality of codewords, as indicated by the RI value provided by the mobile terminal 100, then a sum of the MPR values corresponding to the codewords is multiplied by k.

For example, when there are two codewords, the mobile terminal provides two CQI values, which are used to respectively calculate the MPR values, and the sum of the calculated MPR values is multiplied by k. In a case where the mobile terminal provides CQI values of 14 and 15, the MPR values are 5.1152 and 5.5547, and the wb_MPR value is k*(5.1152+5.5547).

After the wb_MPR value is calculated in step 215, then the controller 140, in step 220, calculates an average value of the wb_MPR values, which is designated as avg_wb_MPR, at a predetermined period T1 using the Equation (1) below. In order to calculate the avg_wb_MPR value, Infinite Impulse Response (IIR) filtering, or any other suitable method or operation, may be used. For example, the avg_wb_MPR value may be calculated using Equation (1) below:

$$\text{avg\_wb\_MPR}(\text{new}) = (1-a)*\text{avg\_wb\_MPR}(\text{old}) + a*\text{wb\_MPR}(\text{new}) \quad \text{Equation (1)}$$

wherein, avg_wb_MPR(new) refers to an average of a newly calculated wb_MPR values; avg_wb_MPR(old) refers to an average of wb_MPR values prior to those used in calculating the avg_wb_MPR(new); wb_MPR(new) refers to wb_MPR value used after avg_wb_MPR(old) is calculated; and a refers to a coefficient used during IIR filtering, wherein a may be a value of 1/2, 1/4, 1/8, 1/16, 1/32, 1/64, 1/128, 1/256, 1/512, 1/1024, or other similar and suitable values.

After the avg_wb_MPR value is calculated in step 220, the controller 140 proceeds to step 225 and calculates an est_cinr_dB, which is in units of decibels (dBs) and is an estimation of the downlink Carrier to Interference Ratio (CINR) regarding the mobile terminal 110, at another predetermined period T2 using the avg_wb_MPR value. For example, the est_cinr_dB value may be calculated using Equation (2) below:

$$\text{est\_cinr\_dB} = \text{avg\_wb\_MPR}*r1 - r2 \quad \text{Equation (2)}$$

wherein, r1 and r2 may be determined in connection with a number of antenna ports and the RI. Exemplary values of the number of antenna ports and r1 and r2 values is given below:
  i) if number of antenna ports=1, the r1=0.0061, r2=3.0574
  ii) if number of antenna ports=2 and RI=0, then r1=0.0050, r2=5.2389
  iii) if number of antenna ports=2 and RI=1, then r1=0.0034, r2=3.0063

After the est_cinr_dB value is calculated in step 225, the controller 140 proceeds to step 330 and compares the est_cinr_dB value with a predetermined threshold value. The comparison of step 330 is used to adjust the PA value. Specifically, when the base station 110 and the mobile terminal 100 make a communication connection, the PA value is set. When the est_cinr_dB value is larger than a first threshold value, i.e., step 230 returns a YES, then the controller 140 determines that the mobile terminal 100 is in an area of high field strength and proceeds to step 235 in order to determine whether the PA value is adjusted. On the other hand, when the est_cinr_dB value is less than the first threshold, i.e., step 230 returns a NO, then the controller 140 proceeds to step 250. In step 235, when it is determined that the PA value has not been adjusted, the controller 140 proceeds to step 240 and adjusts the PA value. Alternatively, when the controller 140 determines that the PA value has already been adjusted in step 235, then the controller 140 maintains the adjusted PA value in step 245.

In step 240, adjustment of the PA value may be done by reducing the PA value by a predetermined value so that it becomes smaller than a preset value. The preset value may be a default value of the PA that is set after the mobile terminal makes a call connection, and it will be assumed hereinafter that the default value is used as the preset value. The first threshold value may be determined so as to guarantee a downlink channel quality even if the base station 110 reduces the transmission power level.

Returning to step 230, when the est_cinr_dB value is determined to be smaller than the first threshold value, there still may be a reason for the controller 140 to adjust the PA value. However, since the difference between the est_cinr_dB value and the first threshold value may be small, adjustment of the PA value may be unnecessary. To this end, the controller 140 may determine whether to adjust the PA value using a second threshold value that is different from the first threshold value.

For example, the controller 140 sets a first threshold value and a second threshold value which is smaller than the first threshold value. Then, in step 250, if the controller 140 determines that the est_cinr_dB value is larger than the second threshold value, the controller 140 proceeds to step 255 and maintains the PA value. On the other hand, in step 250, if the controller 140 determines that the est_cinr_dB value is smaller than the second threshold value, then the controller 140 proceeds to step 260 and determines whether the PA value is a default value. When the controller 140 determines that the PA value is a default value in step 260, then the controller 140 proceeds to step 270 and maintains the PA value. On the other hand, when the controller 140 determines that the PA value is not a default value in step 260, then the controller 140 proceeds to step 265 and adjusts the PA value to be the default value. Adjustment of the PA value to be the default value may be done by increasing the reduced PA value.

In order to prevent frequent changing of the PA value, the difference between the first threshold and the second threshold values may be set according to a predetermined range. Furthermore, the process of comparing the est_cinr_dB value and the second threshold value and then adjusting the PA value may be performed selectively, electively or at predetermined times, because it is for the purpose of preventing frequent changing of the PA value. Therefore, the controller 140 may change the PA value according to whether the PA value is adjusted or not, in order to adjust the PA value to the default value when the est_cinr_dB value is smaller than the first threshold value in step 230.

An exemplary embodiment of the present invention provides a base station that may control transmission power with respect to each mobile terminal according to a channel state of the mobile terminal. In addition, when the mobile terminal is in a good channel state, the base station reduces transmission power for the mobile terminal so as to reduce the EVM and improve the transmission signal quality. Furthermore, when the mobile terminal is in a poor channel state, the base station may not change the transmission power for the mobile terminal, and may instead maintain the base station's coverage.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling power by a base station in a wireless communication system, the method comprising:
  receiving channel state information from a mobile terminal;
  calculating information regarding a Modulation order Product code Rate (MPR) of the mobile terminal using the channel state information; and
  controlling transmission power for the mobile terminal according to the calculated information regarding the MPR,
  wherein the calculating of the information includes calculating a first MPR of the mobile terminal using a Channel Quality Indicator (CQI) received from the mobile terminal and calculating a second MPR by multiplying the first MPR by a value.

2. The method as claimed in claim 1, wherein the channel state information comprises at least one of the Channel Quality Indicator (CQI), a Rank Indicator (RI), and a Precoding Matrix Indicator (PMI).

3. The method as claimed in claim 1, wherein the calculating of the information further comprises:
calculating a third MPR by averaging more than one of the second MPR.

4. The method as claimed in claim 3, wherein the third MPR is calculated by averaging a pre-calculated second MPR and a newly-calculated second MPR, and
wherein each of the pre-calculated MPR and the newly-calculated MPR are one of the more than one of the second MPR.

5. The method as claimed in claim 3, wherein the controlling of the transmission power for the mobile terminal comprises:
calculating an estimation value that estimates channel quality using the third MPR;
comparing the estimation value with a first threshold value;
determining whether the transmission power for the mobile terminal has been adjusted when the estimation value is larger than the first threshold value;
maintaining the adjusted transmission power when the transmission power has been adjusted; and
adjusting the transmission power when the transmission power has not been adjusted.

6. The method as claimed in claim 5, wherein the controlling of the transmission power for the mobile terminal comprises:
maintaining the transmission power when the estimation value is smaller than the first threshold value and when the estimation value is larger than a second threshold value, and
wherein the second threshold value is smaller than the first threshold value.

7. The method as claimed in claim 6, wherein the controlling of the transmission power for the mobile terminal comprises:
determining whether the transmission power has been adjusted when the estimation value is smaller than the second threshold value;
changing the transmission power to a value before adjustment of the transmission power when the transmission power has been adjusted; and
maintaining the transmission power when the transmission power has not been adjusted.

8. A base station in a wireless communication system, the base station comprising:
a receiver for receiving channel state information from a mobile terminal;
a transmitter for transmitting a signal to the mobile terminal; and
a controller for calculating information regarding a Modulation order Product code Rate (MPR) of the mobile terminal using the channel state information and for controlling transmission power for the mobile terminal according to the calculated information regarding the MPR,
wherein the controller calculates a first MPR of the mobile terminal using a Channel Quality Indicator (CQI) received from the mobile terminal, and
wherein the controller calculates a second MPR by multiplying the first MPR by a value.

9. The base station as claimed in claim 8, wherein the channel state information comprises at least one of the Channel Quality Indicator (CQI), a Rank Indicator (RI), and a Precoding Matrix Indicator (PMI).

10. The base station as claimed in claim 8,
wherein the controller is for calculating a third MPR by averaging more than one of the second MPR.

11. The base station as claimed in claim 10, wherein the controller is for calculating the third MPR by averaging a pre-calculated second MPR and a newly-calculated second MPR, and
wherein each of the pre-calculated MPR and the newly-calculated MPR are one of the more than one of the second MPR.

12. The base station as claimed in claim 10, wherein the controller is for calculating an estimation value that estimates channel quality by using the third MPR,
wherein the controller is for comparing the estimation value with a first threshold value,
wherein the controller is for determining whether the transmission power for the mobile terminal has been adjusted when the estimation value is larger than the first threshold value,
wherein the controller is for maintaining the adjusted transmission power when the transmission power has been adjusted, and
wherein the controller is for reducing the transmission power when the transmission power has not been adjusted.

13. The base station as claimed in claim 12, wherein the controller is for comparing the estimation value with the first threshold value,
wherein the controller is for maintaining the transmission power when the estimation value is smaller than the first threshold value and the estimation value is larger than a second threshold value, and
wherein the second threshold value is smaller than the first threshold value.

14. The base station as claimed in claim 13, wherein the controller is for determining whether the transmission power has been adjusted when the estimation value is smaller than the second threshold value,
wherein the controller is for changing the transmission power to a value before adjustment when the transmission power has been adjusted; and
wherein the controller is for maintaining the transmission power when the transmission power has not been adjusted.

15. A method for controlling power by a base station in a wireless communication system, the method comprising:
receiving information regarding a channel state of a downlink from a mobile terminal;
determining a downlink channel state of the mobile terminal; and
reducing transmission power of the downlink channel when the downlink channel state of the mobile terminal is equal to or higher than a threshold value,
wherein the determining of the downlink channel state of the mobile terminal includes calculating a first Modulation order Product code Rate (MPR) of the mobile terminal using a Channel Quality Indicator (CQI) received from the mobile terminal and calculating a second MPR by multiplying the first MPR by a value.

16. The method as claimed in claim 15, wherein the determining of the download channel state of the mobile terminal further comprises calculating a channel state of the mobile terminal according to the received information regarding the channel state of the downlink from the mobile terminal.

17. The method as claimed in claim 15, wherein the channel state information comprises at least one of the Channel Quality Indicator (CQI), a Rank Indicator (RI), and a Precoding Matrix Indicator (PMI).

18. The method as claimed in claim 15, further comprising maintaining the transmission power of the downlink channel when the downlink channel state of the mobile terminal is less than the threshold value.

* * * * *